UNITED STATES PATENT OFFICE.

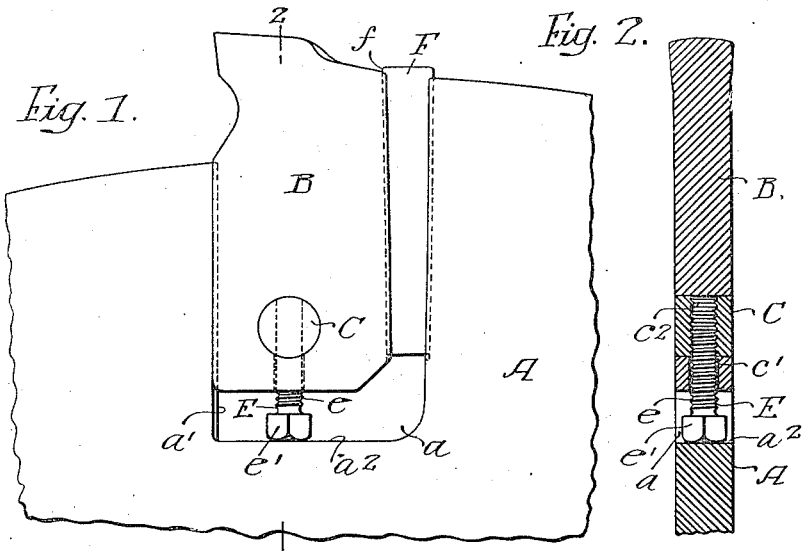
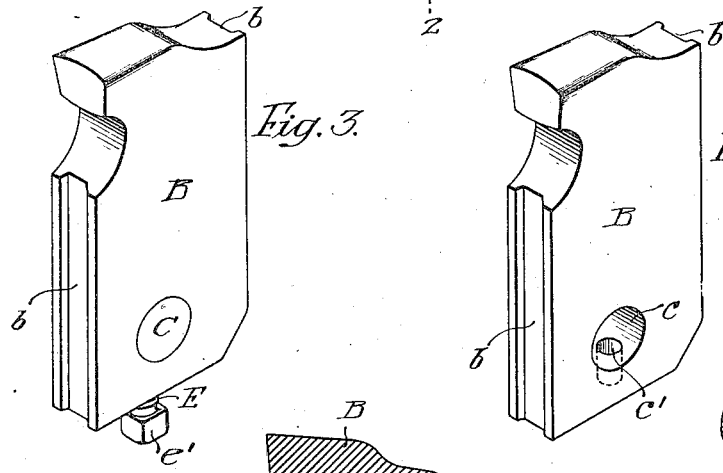
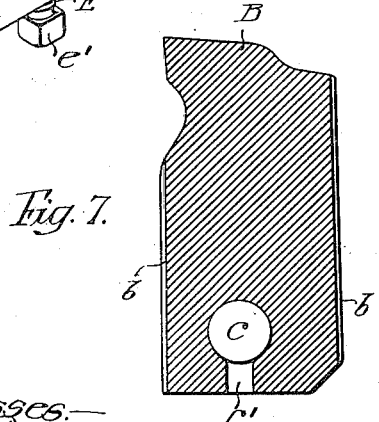
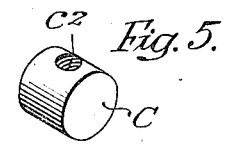
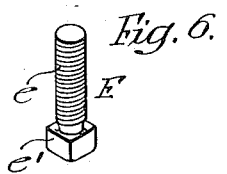

WILLIAM VOLLMER AND AARON K. ANDREWS, OF BURNHAM, PENNSYLVANIA.

SAW-TOOTH.

1,027,943.  Specification of Letters Patent.  Patented May 28, 1912.

Application filed October 16, 1911. Serial No. 654,976.

*To all whom it may concern:*

Be it known that we, WILLIAM VOLLMER and AARON K. ANDREWS, citizens of the United States, residing in Burnham, county of Mifflin, State of Pennsylvania, have invented certain Improvements in Saw-Teeth, of which the following is a specification.

The object of our invention is to make a detachable tooth for metal saws in such a manner that the entire tooth can be made of hard metal, and to provide an adjusting device which can be applied to the tooth so that the tooth can be adjusted radially in the blade.

The invention is particularly adapted to metal saws or cutters of the circular type, in which the blades are recessed to receive detachable teeth.

In the accompanying drawings—Figure 1, is a side view of sufficient of a saw blade to illustrate our invention and showing a tooth in position; Fig. 2, is a sectional view on the line 2—2, Fig. 1; Fig. 3, is a detached perspective view of the tooth with the plug and set screw in position; Fig. 4, is a detached perspective view of the tooth; Fig. 5, is a detached perspective view of the plug; Fig. 6, is a detached perspective view of the set screw; and Fig. 7, is a sectional view of the tooth illustrated in Fig. 4.

A is the body of the saw, having a recess $a$ in which the tooth B is inserted. The front wall of the recess has a rib $a'$ and the tooth is grooved at each edge, as indicated at $b$, to receive at one edge a rib $a'$ and at the other edge a rib $f$ of a wedge F which is also ribbed to enter a groove in the rear wall of the recess. The wedge F holds the tooth in position. These teeth are made of very hard metal and cannot be machined or finished except by grinding after they are formed and hardened, and it is essential in this type of tooth to provide means whereby it can be adjusted in the recess so that as the tooth wears it can be moved out to take up for any wear, and if a new tooth is inserted, then the tooth has to be adjusted to aline with the other teeth.

In making the tooth, we form a transverse hole $c$ therein of comparatively large diameter and a longitudinal hole $c'$ of less diameter, which extends from the transverse hole $c$ to the bottom of the tooth. The walls of these holes are not finished but are left in the rough state. Within the transverse hole $c$ is inserted a plug C of metal softer than the tooth and in this plug is a screw-threaded opening $c^2$ adapted to receive the threaded end $e$ of the adjusting screw E which is provided with a head $e'$ which rests upon the base $a^2$ of the recess $a$ as indicated in Fig. 1. The screw E passes freely through the hole $c'$ and into the threaded opening in the plug, as indicated in Figs. 1 and 2, so that on turning the adjusting screw in one direction the tooth can be forced out of the recess so that it will be in proper alinement with the other teeth, or the screw can be turned in the opposite direction, and the tooth driven in by any suitable means to the extent desired. Thus it will be seen by the above construction that we make a solid hard metal tooth which will stand the cutting strains to which a tooth of this type is subjected, and we form in this tooth a transverse and a longitudinal opening, and in the transverse opening is a plug nut which is engaged by the adjusting screw. Heretofore teeth of this type have been very expensive to manufacture, and by our invention the cost of manufacture is greatly reduced.

We claim :

The combination of an integral tooth for metal saws made of hard metal and having a transverse opening extending from one side of the tooth to the other and having a longitudinal opening extending from said transverse opening to the bottom of the tooth; a plug of softer metal than the tooth inserted in the transverse opening and having a threaded hole in line with the longitudinal opening; with a set screw extending through the longitudinal opening and into the threaded hole in the plug, said set screw having a head by which it can be turned.

In testimony whereof, we have signed our names to this specification, in the presence of two subscribing witnesses.

WILLIAM VOLLMER.
AARON K. ANDREWS.

Witnesses:
WM. H. WREN,
W. P. SEARER.